United States Patent
Choi et al.

(10) Patent No.: US 10,928,368 B2
(45) Date of Patent: Feb. 23, 2021

(54) METHOD FOR MEASURING POLYMER MODIFICATION RATIO

(71) Applicant: LG Chem, Ltd., Seoul (KR)

(72) Inventors: Heung Yeal Choi, Daejeon (KR); No Ma Kim, Daejeon (KR); Yu Jin Kim, Daejeon (KR)

(73) Assignee: LG Chem, Ltd.

( * ) Notice: Subject to any disclaimer, the term of this patent is extended or adjusted under 35 U.S.C. 154(b) by 457 days.

(21) Appl. No.: 15/739,504

(22) PCT Filed: Jul. 14, 2017

(86) PCT No.: PCT/KR2017/007609
§ 371 (c)(1),
(2) Date: Dec. 22, 2017

(87) PCT Pub. No.: WO2018/021742
PCT Pub. Date: Feb. 1, 2018

(65) Prior Publication Data
US 2018/0328901 A1      Nov. 15, 2018

(30) Foreign Application Priority Data

Jul. 26, 2016 (KR) .................. 10-2016-0094589
Jul. 7, 2017 (KR) .................. 10-2017-0086596

(51) Int. Cl.
*G01N 30/88* (2006.01)
*B01J 20/283* (2006.01)
*B01D 15/42* (2006.01)
*B01J 20/10* (2006.01)
(Continued)

(52) U.S. Cl.
CPC ........... *G01N 30/88* (2013.01); *B01D 15/426* (2013.01); *B01J 20/103* (2013.01); *B01J 20/283* (2013.01);
(Continued)

(58) Field of Classification Search
CPC .... G01N 30/88; G01N 30/48; G01N 30/8631; G01N 30/34; G01N 30/8603;
(Continued)

(56) References Cited

U.S. PATENT DOCUMENTS 7,915,349 B2      3/2011   Yamada et al.
10,837,947 B2 *   11/2020  Arigo .................... C09J 123/08
(Continued)

FOREIGN PATENT DOCUMENTS

CN      102234310      11/2011
CN      105606486      5/2016
(Continued)

OTHER PUBLICATIONS

Heinz et al. Two-dimensional chromatography of complex polymers, 5 Separation of blends of styrene-butadiene rubber and butyl rubber. e-Polymers 2003, No. 065. p. 1-13. (Year: 2003).*
(Continued)

*Primary Examiner* — Katherine Zalasky McDonald
(74) *Attorney, Agent, or Firm* — Lerner, David, Littenberg, Krumholz & Mentlik, LLP

(57) ABSTRACT

The present invention relates to a method for measuring a polymer modification ratio, and more particularly, to a method for measuring a polymer modification ratio, which includes preparing a first solution by dissolving a polymer mixture containing a modified polymer and an unmodified polymer in a first solvent, injecting the first solution into a column filled with an adsorbent, adsorbing the modified polymer onto the adsorbent, and eluting the first solution in which the unmodified polymer is dissolved, transferring the eluted first solution to a detector, injecting a second solvent into the column to elute the second solution in which the adsorbed modified polymer is dissolved, and transferring the eluted second solution to the detector.

8 Claims, 4 Drawing Sheets

(51) Int. Cl.
  *B01J 20/281* (2006.01)
  *G01N 30/86* (2006.01)
  *G01N 30/34* (2006.01)
  *G01N 30/00* (2006.01)

(52) U.S. Cl.
  CPC ......... *G01N 30/48* (2013.01); *G01N 30/8631* (2013.01); *G01N 30/34* (2013.01); *G01N 2030/486* (2013.01); *G01N 2030/885* (2013.01)

(58) Field of Classification Search
  CPC ......... G01N 30/8606; G01N 2030/486; G01N 2030/885; B01D 15/426; B01D 15/16; B01D 15/166; B01J 20/103; B01J 20/283
  See application file for complete search history.

(56) References Cited

U.S. PATENT DOCUMENTS

| | | | |
|---|---|---|---|
| 2009/0292043 A1 | 11/2009 | Kurazumi et al. | |
| 2010/0100335 A1 | 4/2010 | Miyagawa | |
| 2017/0002103 A1 | 1/2017 | Sohn et al. | |

FOREIGN PATENT DOCUMENTS

| | | | |
|---|---|---|---|
| JP | 2006003265 A | 1/2006 | |
| JP | 2012172077 A | 9/2012 | |
| JP | 5698560 B2 | 4/2015 | |
| JP | 2015141059 A | 8/2015 | |
| KR | 20160079323 A | 7/2016 | |
| KR | 20160084287 A | 7/2016 | |

OTHER PUBLICATIONS

Glockner, Gottfried. Gradient HPLC of copolymers and chromatographic cross-fractionation. Springer-Verlag, 1991, 227 pages. (Year: 1991).*

Staal, W. J. (1996). Gradient polymer elution chromatography : a qualitative study on the prediction of retention times using cloud-points and solubility parameters. Eindhoven: Technische Universiteit Eindhoven. 173 pages. (Year: 1996).*

Brun Y et al., "Gradient Separation of polymers at critical point of adsorption", Journal of Chromatography A, Elsevier, Aug. 9, 2002, vol. 966, No. 1-2, pp. 25-40, XP004372016.

Elena Uliyanchenko et al., "Challenges in polymer analysis by liquid chromatography", Polymer Chemistry, Jan. 1, 2012, vol. 3, No. 9, p. 2313-2335, XP055476217.

Extended European Search Report including Written Opinion for Application No. EP17808737.5 dated May 28, 2018.

H. J. A. Philipsen et al., "Normal phase gradient polymer elution chromatography of polyester resins", Chromatographia, Nov. 1, 1998, vol. 48, No. 9-10, pp. 623-630, XP055476234.

International Search Report From PCT/KR2017/007609 dated Oct. 25, 2017.

Nakamura, Yoshihisa, "Liquid Cloth Tiger Volume", Manual for Liquid Chromatography, Tsukuba Publishing Society, Nov. 22, 2001, p. 81.

"Ion Exchange Chromatography Principles and Methods," Jan. 2016, GE Healthcare Bio-Sciences AB, Uppsala, Sweden, downloaded from https://cdn.gelifesciences.com/dmm3bwsv3/AssetStream.aspx?mediaformatid=10061&destinationid=10016&assetid=13101, 170 pages.

Chinese Search Report from Application No. CN 201780002520.8 dated Jul. 2, 2019.

Chinese Search Report for Application No. 201780002520.8 dated Feb. 3, 2020, 2 pages.

Yin et al., "Organic chemistry experiment", China Mining University Press, Oct. 31, 2009, pp. 65-67.

Showa Denko KK, "Indicators on Polarity of Various Solvents", https://www.shodex.corn/ja/dc/06/0117.html <https://protect-us_mimecast.com/s/GVZ5C2k19rFpz6J3sn2s1I?domain=shodex.com>, searched on Oct. 1, 2020, 1 page.

* cited by examiner

METHOD FOR MEASURING POLYMER MODIFICATION RATIO

CROSS-REFERENCE TO RELATED APPLICATIONS

This application is a national phase entry under 35 U.S.C. § 371 of International Application No. PCT/KR2017/007609, filed Jul. 14, 2017, which claims priority to Korean Patent Application No. 10-2016-0094589, filed Jul. 26, 2016, and Korean Patent Application No. 10-2017-0086596, filed Jul. 7, 2017, the disclosures of which are incorporated herein by reference.

TECHNICAL FIELD

The present invention relates to a method for measuring a polymer modification ratio, and more particularly, to a method for measuring a polymer modification ratio, in which a measurement process of a modification ratio is simplified, the accuracy of measurement is improved, and a relatively large polymer can also be measured.

BACKGROUND ART

Recently, as interest in energy saving and environmental problems has increased, low fuel consumption in automobiles is demanded. As one of approaches to meet such a demand, a polymer, which has a low rolling resistance and good abrasion resistance and tensile properties and also has steering stability represented by wet skid resistance, is required as a rubber material for a tire.

In order to decrease the rolling resistance of the tire, a method for decreasing the hysteresis loss of vulcanized rubber is suggested. As evaluation indexes of the vulcanized rubber, rebound resilience at 50 to 80° C., tan δ, Goodrich heating, etc. are used. A rubber material having large rebound resilience at the temperature, or small tan δ or Goodrich heating is preferably used.

As a rubber material having small hysteresis loss, natural rubber, polyisoprene rubber, polybutadiene rubber, or the like has been known, however these materials have small wet skid resistance. Thus, recently, a conjugated diene-based polymer such as styrene-butadiene rubber (hereinafter referred to as SBR) or butadiene rubber (hereinafter referred to as BR) is prepared by an emulsion polymerization or a solution polymerization and used as a rubber for a tire. Thereamong, the greatest advantages of the solution polymerization compared to the emulsion polymerization is that the content of a vinyl structure and the content of styrene regulating the physical properties of the rubber may be optionally controlled, and the molecular weight and the physical properties may be adjusted via coupling, modification, or the like. Therefore, the structure of the SBR or BR finally produced may easily change, the movement of a chain end may decrease due to the bonding or modification of the chain end, and the bonding force with a filler such as silica or carbon black may increase. Accordingly, the SBR prepared by the solution polymerization may be widely used as a rubber material for a tire.

Meanwhile, when the conjugated diene-based polymer is modified, a modified part greatly influences compounding processability, physical properties and the like through interaction with an inorganic filler during preparation of a rubber composition. The modified part is determined according to the modification ratio of the conjugated diene-based polymer, that is, how much the polymerization active site of the conjugated diene-based polymer has been modified. Thus, the modification ratio is utilized as an important index in determining the physical properties of a rubber composition.

In this regard, Japanese Patent Publication No. 5698560, etc., discloses a method for measuring the modification ratio relative to a polystyrene gel by using gel permeation chromatography (GPC), as a method for measuring the modification ratio. Specifically, a silica-based column (silica GPC column) capable of adsorbing modified components and a polystyrene-based column (normal GPC column, and also called PS column) not adsorbing modified components are respectively used, and standard polystyrene not adsorbed to the column is representatively added to the sample for measurement. The modification ratio is calculated according to Equation 1 below from the difference (the hatched area in FIG. 1) of the refractive index (RI) obtained through the above process.

$$\text{Modification ratio (\%)} = \frac{\text{Hatched area}}{PS \text{ column area}} \times 100 \quad \text{[Equation 1]}$$
$$= \frac{(PS \text{ column area} - \text{Silica column area})}{PS \text{ column area}} \times 100$$

However, the measurement of the modification ratio through the gel permeation chromatography is disadvantageous in that the accuracy of measurement is not be ensured because this measurement requires a separate standard material called polystyrene, and the modification ratio is calculated by comparing the chromatogram of the standard material with that of the mixture of the standard material and the polymer. Therefore, a simpler and more accurate method for measuring the modification ratio is continuously required.

PRIOR ART DOCUMENT

Patent Document

Japanese Patent Publication No. 5698560

DISCLOSURE OF THE INVENTION

Technical Problem

An aspect of the present invention provides a method for measuring a polymer modification ratio, in which a process for measuring the modification ratio is simplified, the accuracy of measurement is improved, and a relatively large polymer can also be measured.

Technical Solution

According to an embodiment of the present invention to solve the limitations, the present invention provides a method for measuring a polymer modification ratio, including: preparing a first solution by dissolving a polymer mixture including a modified polymer and an unmodified polymer in a first solvent; injecting the first solution into a column filled with an adsorbent; adsorbing the modified polymer to the adsorbent, and eluting the first solution in which the unmodified polymer is dissolved; transferring the eluted first solution to a detector; injecting a second solvent into the column to elute the second solution in which the adsorbed modified polymer is dissolved; and transferring the eluted second solution to the detector.

Advantageous Effects

According to the present invention, when measuring a modification ratio of a polymer, the modification ratio may be measured by using only a modified polymer without a need in comparative measurement with a standard material, so that there are effects that the measurement process of the modification ratio is simplified, the accuracy of measurement is improved, and the modification ratio of even relatively large polymers which are unable to be measured by gel permeation chromatography can also be measured.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Hereinafter the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
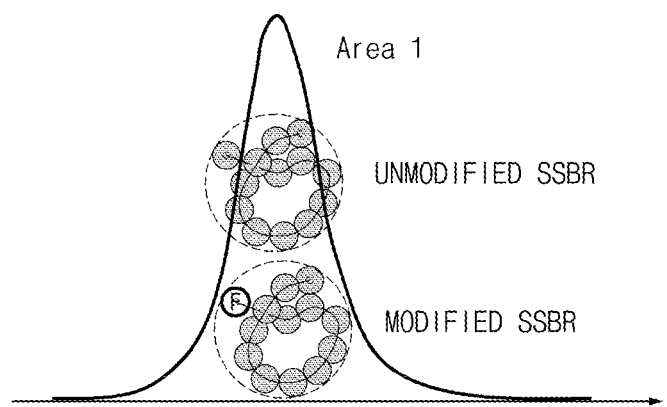
FIG. 1 is a schematic view illustrating a method for measuring a modification ratio according to the related art.
Figure 1:
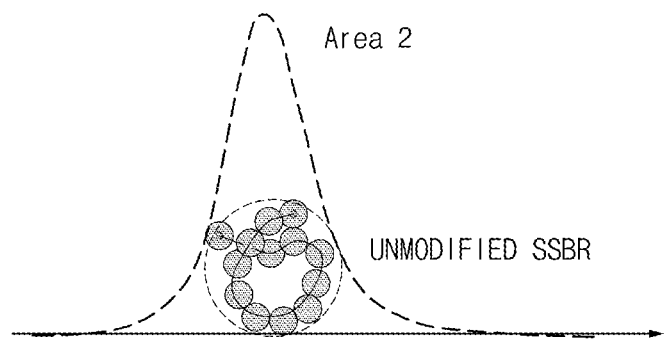
Figure 1:
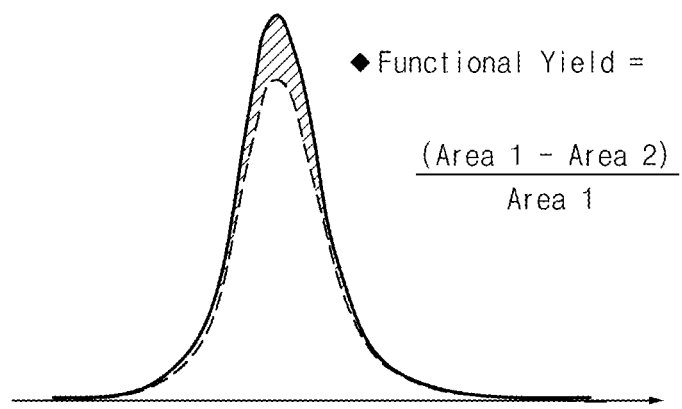
Figure 2:
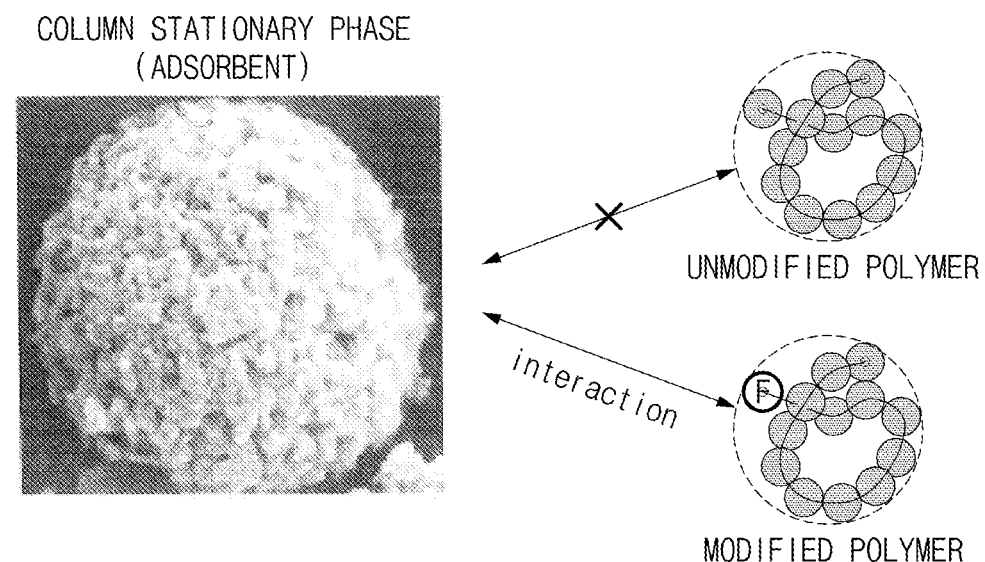
FIG. 2 is a reference view illustrating a correlation between an adsorbent and an unmodified polymer or a modified polymer according to an embodiment of the present invention.
Figure 3:
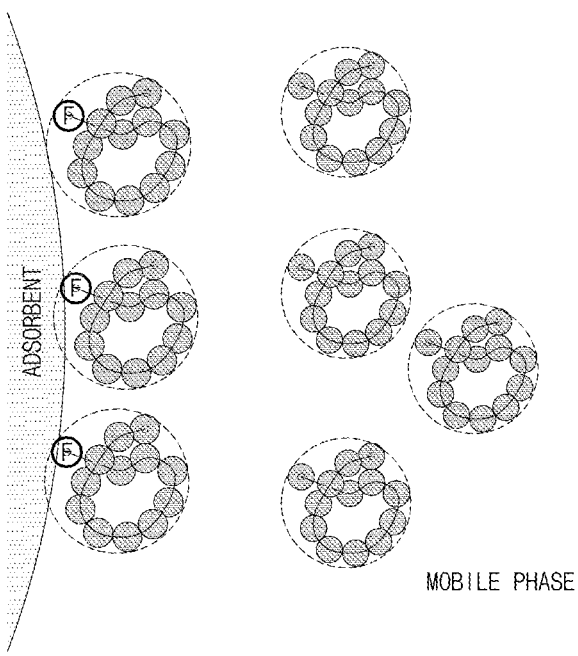
FIG. 3 is a reference view illustrating that the modified polymer is adsorbed onto the adsorbent when a first solution in a mobile phase passes through a column, according to an embodiment of the present invention.
Figure 4:
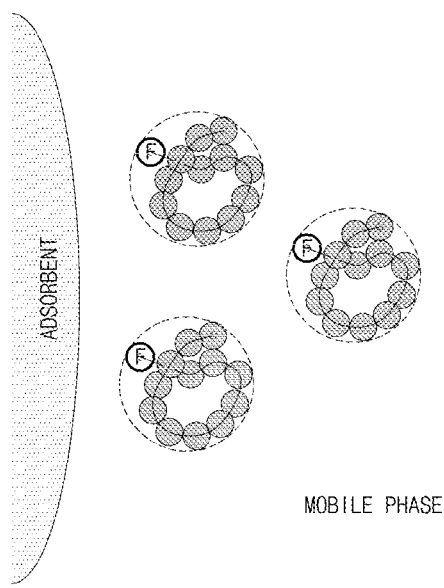
FIG. 4 is a reference view illustrating that the modified polymer is desorbed from the adsorbent when a second solution in a mobile phase passes through the column, according to an embodiment of the present invention.
Figure 5:
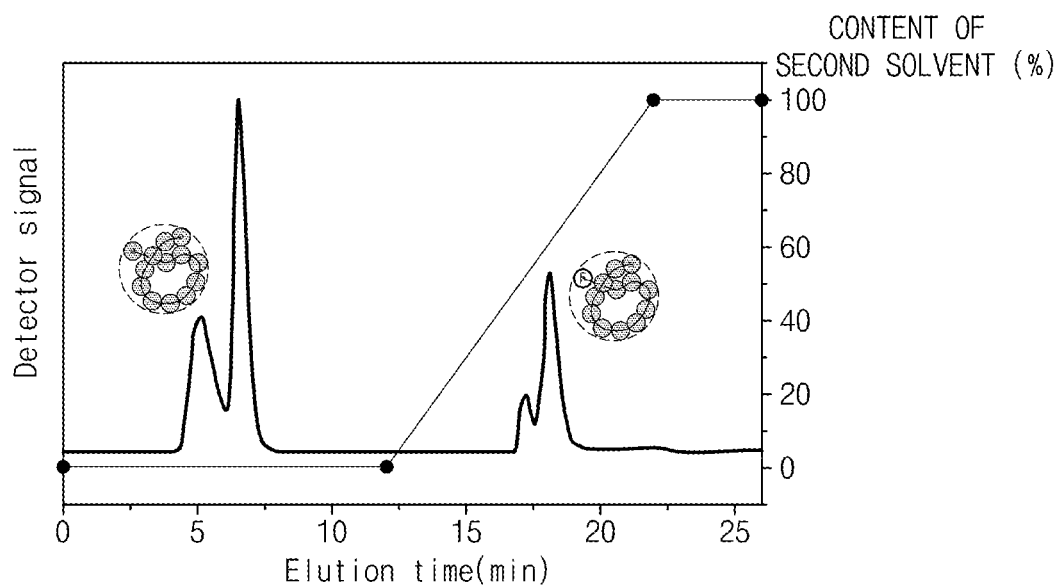
FIG. 5 is a chromatogram showing a change in a detection solution upon injection of a second solvent, according to an embodiment of the present invention.

A method for measuring a polymer modification ratio according to the present invention uses a feature in which only a modified polymer is adsorbed onto an adsorbent (see FIG. 2). According to an embodiment, the method for measuring a polymer modification ratio may include: preparing a first solution by dissolving a polymer mixture including a modified polymer and an unmodified polymer in a first solvent; injecting the first solution into a column filled with an adsorbent; adsorbing the modified polymer onto the adsorbent (see FIG. 3), and eluting the first solution in which the unmodified polymer is dissolved; transferring the eluted first solution to a detector; injecting a second solvent into the column to elute a second solution (see FIG. 4) in which the adsorbed modified polymer is dissolved; and transferring the eluted second solution to the detector.

In FIGS. 1 to 5 of the present invention, a part of the modified polymer is denoted by "F", which indicates that a part of the polymer has been modified and is only for being distinguished from the unmodified polymer, and which does not mean the polymer has been modified into a specific element, and also does not limit the atomic arrangement and configuration to be modified.

The modification ratio herein may mean, for example, a ratio of a modified polymer to an unmodified polymer when a polymer having a polymerization active site therein is modified with a modifier, which may be indicated as a percentage (%) with respect to the entirety of the modified polymer and the unmodified polymer. The modifier may be, for example, selected depending on the polymer and the purpose of modification, and is not particularly limited.

A polymer, the modification ratio of which is measurable according to an embodiment of the present invention, is not particularly limited as long as the polymer may be modified by the modifier, but may be, for example, a homopolymer polymerized with a single monomer or a copolymer obtained by copolymerizing two or more monomers.

According to an embodiment of the present invention, the method for measuring a polymer modification ratio may be used when the modification ratio of the conjugated diene-based polymer is measured. As a specific example, the method may be used in the measurement for the modification ratio of an aromatic vinyl compound-conjugated diene-based polymer.

The column of the present invention may be a column capable of being used for chromatography, for example, a normal phase column in which a stationary phase is polar and a mobile phase is nonpolar, or a reverse phase column in which the stationary phase is nonpolar and the mobile phase is polar.

The adsorbent according to an embodiment of the present invention means the stationary phase of the column, and may be a filler to be filled in the column, which may appropriately be selected depending on the modified part that has been modified by the modifier. The adsorbent may be, for example, one selected from the group consisting of a silica-based adsorbent, a polymer-based adsorbent, an alumina ($Al_2O_3$)-based adsorbent, a graphitized carbon adsorbent and zirconia adsorbent. In particular, the adsorbent may be a silica-based adsorbent, and in this case, there is an effect that various modified polymers are easily adsorbed.

The silica-based adsorbent may be, for example, may be at least one selected from the group consisting of: a silica gel adsorbent derived from silica ($SiO_2$); and a adsorbent in which a silanol (Si—OH) group of the silica gel surface is substituted or end-capped with at least one derived group selected from the group consisting of a chain, branched or cyclic alkylsilane having 1 to 30 carbon atoms, arylsilane having 5 to 30 carbon atoms, a chain, branched or cyclic alkylsianosilane having 1 to 30 carbon atoms, and a chain, branched or cyclic aminoalkylsilane having 1 to 30 carbon atoms. Specific examples of the silica-based adsorbent may be at least one selected from the group consisting of a silica gel adsorbent; and an adsorbent which is end-capped with at least one derived group selected from the group consisting of trimethylsilane, ethyl(dimethyl)silane, propyl(dimethyl)

silane, butyl(dimethyl)silane, octyl(dimethyl)silane, decyl (dimethyl)silane, octadecyl(dimethyl)silane, cyanopropyl (dimethyl)silane, aminopropyl(dimethyl)silane and 4-phenylbutyl(dimethyl)silane.

The adsorbent may have, for example, a particle size of 0.001 to 100 µm, 1 to 100 µm, 1 to 50 µm or 3 to 30 µm, and there is an effect that the modified polymer is easily adsorbed within this range. The particle size may mean, for example, an average particle diameter according to an adsorbent shape. Specifically, when the adsorbent has a spherical or ellipsoidal shape, the particle size may mean an average particle diameter with respect to a diameter or a major axis; and when the adsorbent has a polyhedral shape, the particle size may mean an average particle diameter with respect to a major axis.

According to an embodiment of the present invention, the first solvent and the second solvent may be each independently a polar solvent or a nonpolar solvent. Preferably, when the first solvent is a polar solvent, the second solvent may be a nonpolar solvent; and when the first solvent is a nonpolar solvent, the second solvent may be a polar solvent. In this case, there is an effect that the unmodified polymer is eluted from the first solution and the modified polymer is eluted from the second solution more effectively, respectively.

As another example, the first solvent and the second solvent may be each independently a polar solvent having a difference in polarity. Preferably, when the first solvent is a polar solvent having a high polarity, the second solvent may be a polar solvent having a low polarity; and when the first solvent is a polar solvent having a low polarity, the second solvent may be a polar solvent having a high polarity. The polarity may not an absolute value but a relative concept depending on the polarity of the polar solvent used for the first solvent and the second solvent, respectively. In this case, there is an effect that the unmodified polymer is eluted from the first solution and the modified polymer is eluted from the second solution more effectively, respectively.

The polar solvent is not particularly limited as long as the polar solvent is usable in chromatography and capable of dissolving modified polymers and unmodified polymers. However, the polar solvent may be, for example, at least one selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethylsulfoxide (DMSO), methyl ethyl ketone, benzonitrile, pyridine, nitroethane, benzyl alcohol, methoxy ethanol and formamide.

The nonpolar solvent is not particularly limited as long as the nonpolar solvent is usable in chromatography and capable of dissolving modified polymers and unmodified polymers. However, the nonpolar solvent may be, for example, at least one selected from the group consisting of hexane, benzene, toluene, diethyl ether, chloroform, ethylacetate, dichloromethane, cyclohexane, tetrachloromethane, iso-octane, xylene, butyl ether, isopropyl ether and ethylene chloride.

According to an embodiment of the present invention, the first solution may be injected at a flow rate of 0.001 to 30 ml/min, 0.01 to 20 ml/min, 0.1 to 10 ml/min, or 0.5 to 1 ml/min, and there is an effect that, within this range, the entire amount of the modified polymer is more effectively adsorbed onto the adsorbent and only the unmodified polymer is eluted together with the first solvent.

According to an embodiment of the present invention, the second solvent may be injected at a flow rate of 0.001 to 30 ml/min, 0.01 to 20 ml/min, 0.1 to 10 ml/min, or 0.5 to 1 ml/min, and there is an effect that, within this range, the second solution in which the modified polymer adsorbed onto the adsorbent is dissolved is more effectively eluted.

According to an embodiment of the present invention, the second solvent may be injected after the entire amount of the unmodified polymer is eluted. The point in time when the entire amount of unmodified polymer is eluted may indicate a point in time when the signal of the unmodified polymer is no longer detected from the detector. Also, as another example, the second solvent may be injected into the column into which the first solution is injected after the injection of the first solution has been completed. Preferably, the second solvent may be continuously injected into the column, into which the first solution is injected, according to gradient elution by which the composition of the solvent is continuously changed. In this case, there is an effect that more accurate measurement is possible without interruption of the signal upon detection.

According to an embodiment of the present invention, when the second solvent is continuously injected into the column into which the first solution is injected according to the gradient elution, the first solution and the second solution may be simultaneously eluted from the time at which the second solvent is injected, and the simultaneously eluted first and second solutions may be transferred to the detector at the same time. In addition, with respect to 100 vol % of each of the first solution and the second solution transferred to the detector, the amounts of the first solution and second solution may gradually increase or decrease from the injection time of the second solvent such that the first solution decreases from 100% to 0%, and the second solution increases from 0% to 100%, respectively, depending on the injection flow rate of the second solvent. As a specific example, the first solution and the second solution may be simultaneously detected at the detector from the injection time of the second solution; the detection amount of the first solution previously injected according to the injection of the second solvent decreases from 100 vol % to 0 vol %; the detection amount of the second solution increases from 0 vol % to 100 vol % at a rate at which the detection amount of the first solution decreases; and when the elution of the first solution is completed, only the second solution may be detected (see FIG. 5).

According to an embodiment of the present invention, the method for measuring a polymer modification ratio may use a chromatography measuring instrument, for example, a liquid chromatography measuring instrument, and as a specific example, may be a chromatography measuring instrument including a mobile phase storage device for storing the first solution and the second solvent; a pump for constantly and reproducibly supplying mobile phases to the column; an injector for adjusting the injection volume of the solution or solvent injected into the column; a column for separating the modified polymer and the unmodified polymer; and a detector for sensing the eluted modified or unmodified polymers.

The mobile phase storage device may be provided such that, for example, two or more mobile phase storage devices are provided. As a specific example, the mobile phase storage device for storing the first solution and the mobile phase storage device for storing the second solvent may be each separately provided. Also, the mobile phase storage device may include a separate gradient elution device for employing gradient elution.

For example, the pump may generate a pressure of 0.1 to 10,000 psi or 100 to 5,000 psi, adjust a flow rate of 0.01 to 20 ml or 0.1 to 10 ml, have no pulse during supply of a solution or solvent, and maintain the speed variation of a flow rate by 1% or less, or 0.1 to 0.5%. In another example, the pump may be a single-head pump or a dual-head pump, and preferably a dual-head pump. In this case, there is an effect that the gradient elution may be easily applied.

The injector may be, for example, a rheodyne injector or an automatic injector, and the rheodyne injector may have, for example, a loop volume of 1 to 500 μl, 5 to 200 μl, or 10 to 100 μl, and there is an effect that injection accuracy is high within this range.

The detector may be selected from among, for example, a UV/Vis detector, a fluorescence detector, a refractive index detector, and an evaporative light scattering detector. Preferably, the detector may be an evaporative light scattering detector. In this case, a response factor is constant, an accurate composition analysis is possible without preparing a calibration curve by a standard material, and detection according to the gradient elution may be possible, thereby providing an excellent effect of resolution and separation sensitivity.

The modification ratio of the present invention may be calculated from, for example, a chromatogram detected through the chromatography measurement instrument, and as a specific example, may be calculated by Equation 2 below.

$$\text{Modification ratio (\%)} = \frac{\text{Peak area of modified polymer}}{\text{Peak area of unmodified polymer} + \text{Peak area of modified polymer}} \times 100 \quad \text{[Equation 2]}$$

The peak area of the unmodified polymer may be a peak area of the chromatogram for the first solution transferred to the detector, and the peak area of the modified polymer may be a peak area of the chromatogram for the second solution transferred to the detector.

MODE FOR CARRYING OUT THE INVENTION

Hereinafter, the present invention will be described in more detail by embodiments. However, the following embodiments are only for exemplary purposes and are not intended to limit the scope of the invention.

EXAMPLES

Example 1

270 g of styrene, 710 g of 1,3-butadiene and 5,000 g of normal hexane, and 0.86 g of 2,2-bis(2-oxoranyl)propane as a polar additive were placed in a 20 L autoclave reactor, and then the internal temperature of the reactor was raised to 40° C. When the internal temperature of the reactor reached 40° C., 4 mmol of n-butyllithium was added to the reactor to perform an adiabatic warming reaction. After 20 minutes, 20 g of 1,3-butadiene was added to the reactor, and 5 minutes later, 4.3 mmol (98% purity) of N,N-bis(triethoxysilylpropyl)aminopropyl-1-imidazole as a modifier was added and allowed to react for 15 minutes. Thereafter, the polymerization reaction was stopped by using ethanol, and 45 ml of a hexane solution in which 0.3 wt % of butylated hydroxyl toluene (BHT) was dissolved as an antioxidant was added.

The obtained polymer was placed in warm water heated with steam and stirred to remove the solvent, followed by roll drying to remove the residual solvent and water, thereby preparing a styrene-butadiene copolymer of which the end is modified.

Figure 6:
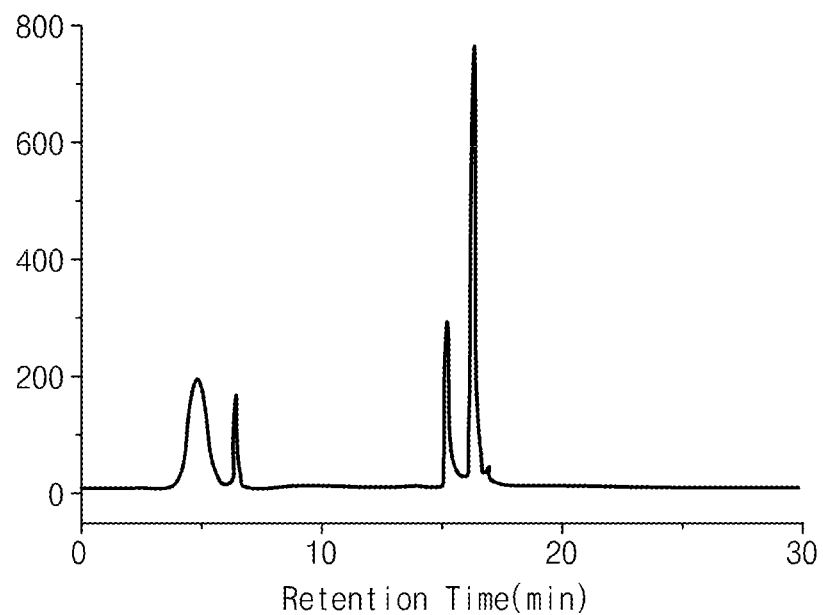
FIG. 6 is a chromatogram according to Example 1 of the present invention.

Meanwhile, in order to measure the modification ratio of the modified styrene-butadiene copolymer, the modified styrene-butadiene copolymer was dissolved in cyclohexane and stored in the mobile phase storage device and tetrahydrofuran (THF) was stored in another mobile phase storage device. Each of the mobile phase storage devices was connected to a dual-head pump, and first, the solution of the mobile phase storage device in which the modified styrene-butadiene copolymer is dissolved was injected into the column filled with a silica adsorbent, by using the pump and an injector having a loop volume of 20 μl. In this case, the pressure of the pump was 450 psi, and the injection flow rate was 0.5 ml/min. Subsequently, it was confirmed that the unmodified styrene-butadiene copolymer in the modified styrene-butadiene copolymer was no longer detected from the detector. Then, from 5 minutes after the start of the injection, the tetrahydrofuran was injected into the column through the pump, wherein the pressure of the pump was 380 psi, and the injection flow rate was 0.5 ml/min. After it was confirmed that the modified styrene-butadiene copolymer was no longer detected in the modified styrene-butadiene copolymer from the detector according to the injection of tetrahydrofuran, the injection of the second solvent was completed. Subsequently, the modification ratio was calculated by Equation 2 below from the detected chromatogram results (see FIG. 6). In this case, the modification ratio was 56.4%.

$$\text{Modification ratio (\%)} = \frac{\text{Peak area of modified polymer}}{\text{Peak area of unmodified polymer} + \text{Peak area of modified polymer}} \times 100 \quad \text{[Equation 2]}$$

Comparative Example 1

A modified styrene-butadiene copolymer was prepared in the same manner as in the above-described Examples, except that N,N-bis(triethoxysilylypropyl)aminopropyl-1-imidazole (75% purity) was added in the same amount as a modifier.

Figure 7:
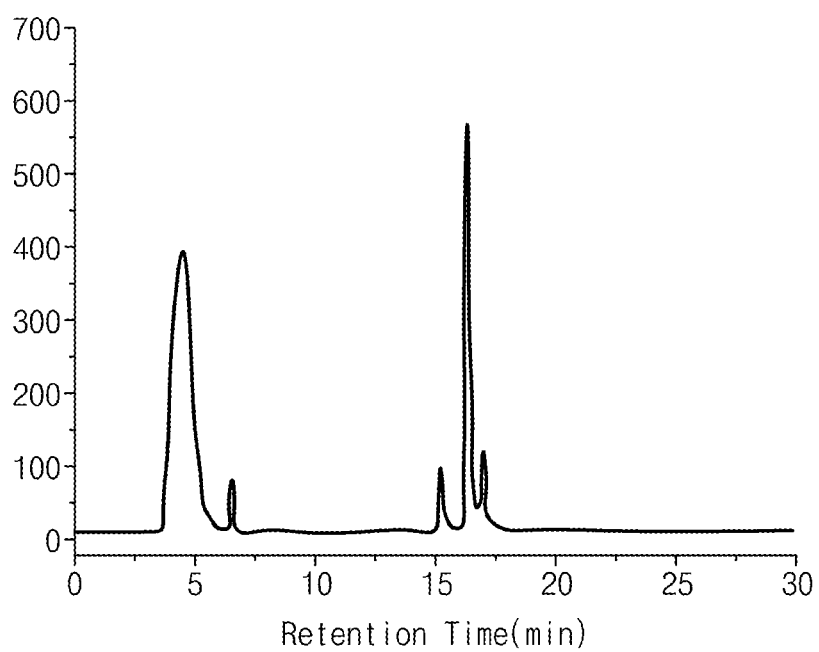
FIG. 7 is a chromatogram according to Comparative Example 1 of the present invention.

The modification ratio of the prepared modified styrene-butadiene copolymer was measured in the same manner as in the above-described Examples, and the modification ratio (%) was calculated according to Equation 2 above from the detected chromatogram results (see FIG. 7). In this case, the modification ratio was 31.6%.

Experimental Example 1

For the modified styrene-butadiene copolymers of Example 1 and Comparative Example 1 which exhibited different modification ratios due to the difference in purity of the modifier, a Mooney viscosity (MV), contents of styrene monomer and vinyl in the copolymer, a weight average molecular weight (Mw), a number average molecular weight (Mn) and a molecular weight distribution (PDI) were measured, respectively, and the results are shown in Table 1 below.

1) Mooney Viscosity (MV)

Two rubber specimens having a weight of 15 g or more were preheated for 1 minute and then measured at 100° C. for 4 minutes by using MV-2000 manufactured by ALPHA Technologies.

2) Contents of Styrene Monomer and Vinyl

The contents of styrene monomer and vinyl were measured by using NMR.

3) Molecular Weight Analysis

The peak molecular weight (Mp), the weight average molecular weight (Mw) and the number average molecular weight (Mn) of each copolymer were measured by gel permeation chromatograph (GPC) analysis under the condition of 40° C. In this case, the column was used by combining two PLgel Olexis columns manufactured by Polymer Laboratories with one PLgel mixed-C column, and all newly replaced columns used mixed bed-type columns. In addition, polystyrene (PS) was used as a GPC standard material when calculating molecular weight. The molecular weight distribution (PDI) was obtained by calculating the ratio of the weight average molecular weight and the number average molecular weight measured by the method and by rounding off the calculated ratio to the second decimal place.

TABLE 1

| Classification | | Example 1 | Comparative Example 1 |
|---|---|---|---|
| n-butyllithium(mmol/h) | | 4 | 4 |
| Polar additive (g/h) | | 0.86 | 0.86 |
| Modifier (mmol/h) | | 4.3 | 4.3 |
| Mooney viscosity (MV) | | 74 | 62 |
| NMR (%) | Styrene monomer | 27 | 27 |
| | Vinyl | 42 | 43 |
| GPC (x10$^4$) | Mp | 22 | 20 |
| | Mn | 35 | 28 |
| | Mw | 50 | 36 |
| | PDI | 1.4 | 1.3 |

Experimental Example 2

In order to observe changes in physical properties according to the modification ratio measured according to the present invention for rubber compositions respectively including the modified styrene-butadiene copolymers of Example 1 and Comparative Example 1 which exhibit the difference in modification ratio due to the difference in purity of the modifier, and molded products prepared therefrom, rubber specimens for measuring physical properties were prepared and tensile and viscoelastic properties thereof were measured. The results were shown in Table 3 below.

1) Preparation of Rubber Specimens

Each of the modified styrene-butadiene copolymers of Example 1 and Comparative Example 1 as raw material rubber was blended under the blending conditions shown in Table 2 below. The contents of the respective raw materials in Table 2 are values calculated based on 100 parts by weight of the rubber.

TABLE 2

| Classification | Raw material | Content (parts by weight) |
|---|---|---|
| First stage Kneading | Rubber | 100 |
| | Silica | 70 |
| | Coupling agent | 11.2 |
| | Oil (Process oil) | 37.5 |
| | Zincifying agent | 3 |

TABLE 2-continued

| Classification | Raw material | Content (parts by weight) |
|---|---|---|
| | Stearic acid | 2 |
| | Antioxidant | 2 |
| | Anti-aging agent | 2 |
| | Wax | 1 |
| | Rubber accelerator | 1.75 |
| Second stage Kneading | Sulfur | 1.5 |
| | Vulcanization accelerator | 2 |
| Total weight | | 233.95 |

Specifically, rubber specimens are kneaded through a first stage kneading and a second stage kneading. In the first stage kneading, raw material rubber (styrene-butadiene copolymer), a filler, an organic silane coupling agent, oil (process oil), a zincifying agent, a stearic acid, antioxidant, an anti-aging agent, a wax, and an accelerator were kneaded by using a Banbury mixer having a temperature controller attached thereto. At this time, the temperature of a kneader was controlled to 150° C., and a primary blend was obtained at a discharge temperature of 145° C. to 155° C. In the second stage kneading, the primary blend was cooled to room temperature, and then the primary blend, sulfur and a vulcanization accelerator were added to the kneader and mixed at a temperature of 100° C. or lower to obtain a second blend. Thereafter, rubber specimens were prepared through a curing process for 20 minutes at 100° C.

2) Evaluation of Tensile Properties

To evaluate tensile properties of the prepared rubber specimens, the tensile strength upon cutting the test pieces and the tensile stress (300% modulus) at 300% elongation were measured according to the tensile test method for ASTM 412.

3) Evaluation of Viscoelastic Properties

To evaluate the viscoelastic properties of the prepared rubber specimens, viscoelastic coefficient (tan δ) was measured in a torsion mode at a frequency of 10 Hz and at each measurement temperature (−60° C. to 60° C.) by using a dynamic mechanical analyzer manufactured by TA company was measured. Payne effect was exhibited as a difference between a minimum value and a maximum value at a strain of 0.28% to 40%. The smaller Payne effect means that dispersibility of a filler such as silica is more excellent. Also, the higher tan δ at a low temperature of 0° C. means that resistance on the wet road surface is more excellent, and the lower tan δ at a high temperature of 60° C. means that hysteresis loss is smaller and rolling resistance, that is, low fuel consumption is more excellent.

TABLE 3

| Classification | Example 1 | Comparative Example 1 |
|---|---|---|
| 300% modulus (kgf/cm$^2$) | 130 | 119 |
| Tensile strength (kgf/cm$^2$) | 203 | 187 |
| Viscoelastic coefficient (Tan δ at 0° C.) | 0.988 | 0.911 |
| Viscoelastic coefficient (Tan δ at 60° C.) | 0.109 | 0.121 |
| Payne effect (60° C., G') | 0.29 | 0.35 |

As shown in Table 3, it can be observed that the modified copolymer of Example 1 in which the copolymer was modified using a high-purity modifier and which had a high modification ratio as measured according to the present invention exhibits more excellent 300% modulus (tensile stress) and tensile strength, and has lower tan δ at 60° C. and higher tan δ at 0° C., than the modified copolymer of Comparative Example 1 in which the copolymer was modified using a low-purity modifier and which had a low modification ratio as measured according to the present invention. Therefore, it was verified that both tensile and viscoelastic properties in Example 1 were improved. In addition, it can be observed that the modified copolymer of Example 1 had much lower G' value at 60° C. than that of Comparative Example 1, and it was verified that the dispersibility of the filler, that is, silica was very high.

From the above results, according to the method for measuring a polymer modification ratio in accordance with the present invention, it was observed that the modification ratio can be measured only by using a modified polymer without a need of comparative measurement with a standard material. Further, when the modification ratio measured by the method for measuring a polymer modification ratio according to the present invention is high, it can be clearly verified that there is an effect in which physical properties are improved through modification.

In other words, even when the same modifier is used for modification, there is a clear difference in the effect of increasing physical properties depending on the modification ratio. It was confirmed that this modification ratio may be used as an important index for confirming a clear improvement in physical properties by simply and accurately measuring the modification ratio.

The invention claimed is:

1. A method for measuring a polymer modification ratio, comprising:
    preparing a first solution by dissolving a polymer mixture containing a modified polymer and an unmodified polymer in a first solvent;
    injecting the first solution into a column filled with an adsorbent;
    adsorbing the modified polymer onto the adsorbent, and eluting the first solution in which the unmodified polymer is dissolved;
    transferring the eluted first solution to a detector;
    injecting a second solvent into the column to elute a second solution in which the adsorbed modified polymer is dissolved; and
    transferring the eluted second solution to the detector, and calculating the modification ratio by Equation 2 below from a chromatogram;

$$\text{Modification ratio (\%)} = \frac{\text{Peak area of modified polymer}}{\text{Peak area of unmodified polymer} + \text{Peak area of modified polymer}} \times 100 \quad \text{[Equation 2]}$$

wherein the peak area of the unmodified polymer is a peak area of the chromatogram for the first solution transferred to the detector, and the peak area of the modified polymer is a peak area of the chromatogram for the second solution transferred to the detector,
wherein the second solvent is injected after the entire amount of the unmodified polymer is eluted, and
wherein the first solvent is a polar solvent or a nonpolar solvent,
the second solvent is a polar solvent or a nonpolar solvent,
the second solvent is a nonpolar solvent when the first solvent is a polar solvent, and
the second solvent is a polar solvent when the first solvent is a nonpolar solvent,
wherein the unmodified polymer is styrene-butadiene copolymer.

2. The method according to claim 1, wherein the polymer is a conjugated diene-based polymer.

3. The method according to claim 1, wherein the adsorbent is a silica-based adsorbent.

4. The method according to claim 1, wherein the polar solvent is at least one selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethylsulfoxide (DMSO), methyl ethyl ketone, benzonitrile, pyridine, nitroethane, benzyl alcohol, methoxy ethanol, and formamide.

5. The method according to claim 1, wherein the nonpolar solvent is at least one selected from the group consisting of hexane, benzene, toluene, diethyl ether, chloroform, ethylacetate, dichloromethane, cyclohexane, tetrachloromethane, iso-octane, xylene, butyl ether, isopropyl ether, and ethylene chloride.

6. The method according to claim 1, wherein the first solution is injected at a flow rate of 0.001 to 30 ml/min.

7. The method according to claim 1, wherein the second solvent is injected at a flow rate of 0.001 to 30 ml/min.

8. The method for claim 1, wherein the second solvent is continuously injected into the column into which the first solution is injected according to gradient elution.

* * * * *